US010126958B2

(12) United States Patent
Ramalingam

(10) Patent No.: US 10,126,958 B2
(45) Date of Patent: Nov. 13, 2018

(54) WRITE SUPPRESSION IN NON-VOLATILE MEMORY

(71) Applicant: INTEL CORPORATION, Santa Clara, CA (US)

(72) Inventor: Anand S. Ramalingam, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/875,160

(22) Filed: Oct. 5, 2015

(65) Prior Publication Data
US 2017/0097782 A1 Apr. 6, 2017

(51) Int. Cl.
G06F 3/06 (2006.01)
G06F 12/02 (2006.01)

(52) U.S. Cl.
CPC ............ *G06F 3/0616* (2013.01); *G06F 3/064* (2013.01); *G06F 3/0647* (2013.01); *G06F 3/0679* (2013.01); *G06F 12/0246* (2013.01)

(58) Field of Classification Search
CPC ...... G06F 3/0616; G06F 3/064; G06F 3/0647; G06F 3/0679
See application file for complete search history.

(56) References Cited

U.S. PATENT DOCUMENTS 8,880,787 B1 * 11/2014 Kimmel ............ G06F 12/0246
711/103
9,021,227 B2 4/2015 Karpov et al.
2002/0116569 A1 * 8/2002 Kim ................ G06F 12/0246
711/103
2008/0215800 A1 * 9/2008 Lee ................. G06F 3/0613
711/103
2011/0010488 A1 * 1/2011 Aszmann .......... G06F 3/0608
711/103

(Continued)

OTHER PUBLICATIONS

Eshghi, K., et al., "SSD Architecture and PCI Express Interface," Inside Solid State Drives (SSDs), Springer Series in Advanced Microelectronics 37, DOI 10. 2013. 28 pages.

(Continued)

*Primary Examiner* — Mano Padmanabhan
*Assistant Examiner* — Patrick W Borges
(74) *Attorney, Agent, or Firm* — Finch & Maloney PLLC

(57) ABSTRACT

Techniques are disclosed for write suppression to improve endurance rating of non-volatile memories, such as QLC-NAND SSDs or other relatively slow, low endurance non-volatile memories. In an embodiment, an SSD is configured with a fast frontend non-volatile memory, a relatively slow lower endurance backend non-volatile memory, and a frontend manager that selectively transfers data from the fast memory to the slow memory based on transfer criteria. In operation, write data from the host is initially written to the fast memory by the frontend manager. The data is moved from the fast memory to the slow memory in bands. For each data band stored in the fast memory, the frontend manager tracks invalid data counts and data age. Only bands that still remain valid are transferred to the slow memory. After a given band has been fully transferred, it is erased and re-usable for other incoming writes by the frontend manager.

18 Claims, 5 Drawing Sheets

(56) References Cited

U.S. PATENT DOCUMENTS

| | | | |
|---|---|---|---|
| 2011/0138131 A1* | 6/2011 | Regni | G06F 17/30221 711/133 |
| 2011/0191558 A1* | 8/2011 | Anderson | G06F 12/16 711/162 |
| 2012/0023283 A1* | 1/2012 | Yang | G06F 12/0246 711/103 |
| 2012/0221774 A1* | 8/2012 | Atkisson | G06F 12/0802 711/103 |
| 2012/0250394 A1* | 10/2012 | Ichihara | G11C 13/0007 365/148 |
| 2013/0173844 A1* | 7/2013 | Chen | G06F 12/0246 711/103 |
| 2013/0275653 A1* | 10/2013 | Ranade | G06F 3/0605 711/103 |
| 2013/0304978 A1 | 11/2013 | Trika et al. | |
| 2014/0254242 A1* | 9/2014 | Siau | G11C 13/0026 365/148 |
| 2014/0258672 A1* | 9/2014 | Herron | G06F 12/0223 711/171 |
| 2015/0186257 A1 | 7/2015 | Ramalingam et al. | |
| 2016/0179386 A1* | 6/2016 | Zhang | G06F 3/064 711/103 |

OTHER PUBLICATIONS

Cornwell, Michael, "Anatomy of a Solid-state Drive," File Systems and Storage, Oct. 17, 2012, vol. 10, issue 10. 17 pages.

"Micron Technical Note NAND Flash 101: An Introduction to NAND Flash and How to Design It in to Your Next Product," Micron Technology, Inc., 2006. pp. 1-27.

Faltus, Radovan, "Solid state drives: Backup capacitors in modem solid state drives," AVX spol.s.r.o., May 1, 2011. 8 pages.

"How Micron SSDs Handle Unexpected Power Loss," A Micron White Paper, Micron Technology, Inc., 2014. pp. 1-4.

* cited by examiner

WRITE SUPPRESSION IN NON-VOLATILE MEMORY

BACKGROUND

A solid-state drive (SSD) includes a non-volatile memory such as NAND flash. An SSD controller in the SSD provides a block access interface (for example, a 512 byte block) to a host controller coupled to the SSD. The SSD controller is typically implemented with a processor configured to carry out NAND/memory management functions, such as reading/writing of data, encryption, error correction, wear leveling, and garbage collection. A typical NAND controller operates in block mode (e.g., 512 byte) multiples for reads and writes.) As newer and cheaper generations of NAND SSDs are built based on smaller lithography, more cells per area are achieved. In addition, and regardless of the lithography, more information can be 'stored' in a single cell by using multiple level programming, such as the case with SSDs that use multilevel cells (MLC) or three level cells (TLC), as compared to single-level cells (SLC). In SLC NAND flash technology, each cell can exist in one of two states, storing one bit of information per cell. Most MLC NAND flash memory has four possible states per cell, so such memories can store two bits of information per cell. A TLC NAND flash memory has eight possible states per cell, so such memories can store three bits of information per cell. The more levels programmed into a single cell (based on the stored voltage level that decodes to a number of bits), the greater the precision at which the threshold voltage ($V_t$) is adjusted. This results in lower endurance and longer read times. Endurance generally refers to the lifespan of a non-volatile memory, and more particularly, to the ability of a non-volatile memory to endure through a specified number of write cycles before becoming unreliable.

DETAILED DESCRIPTION

Figure 1:
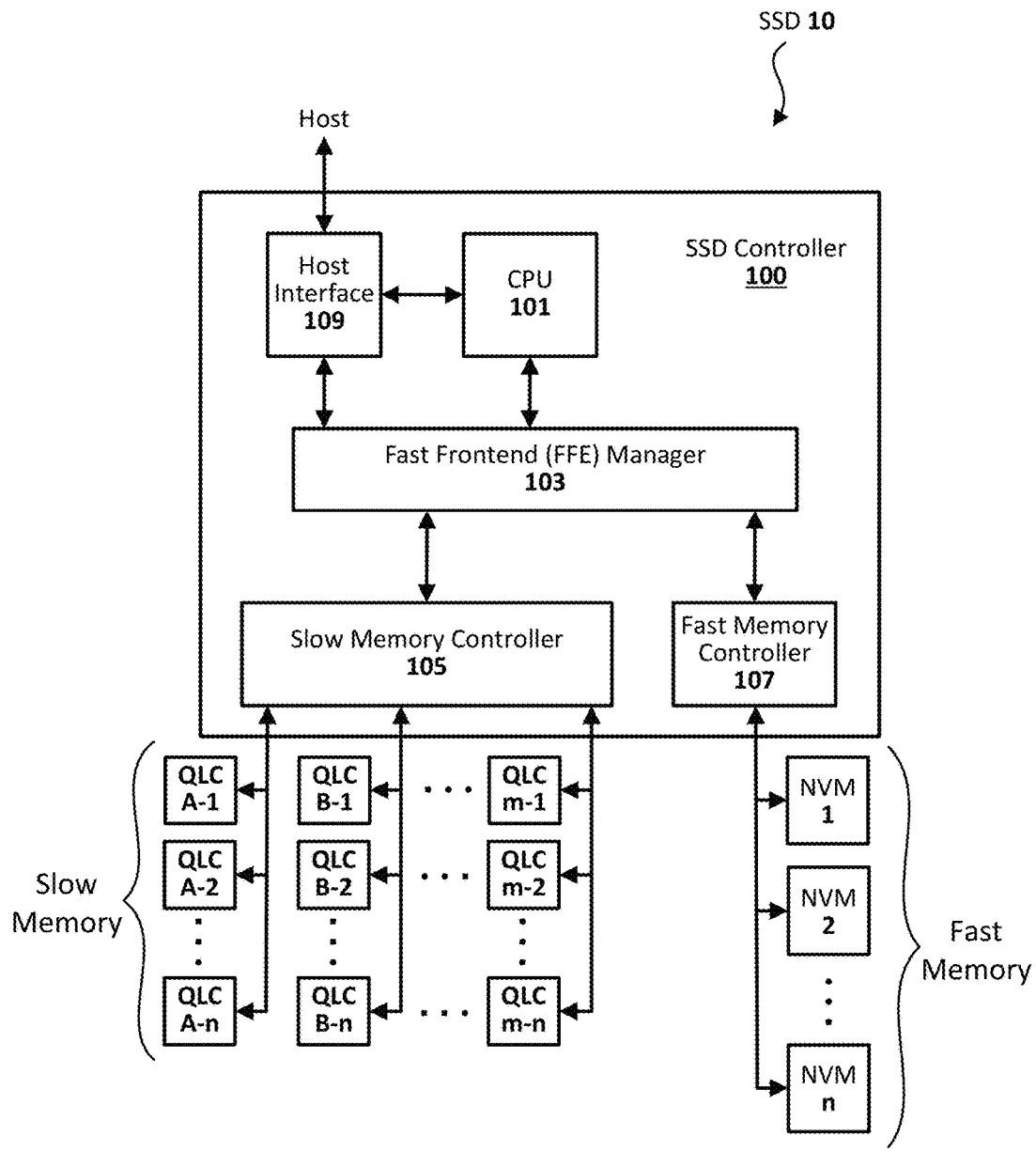
FIG. 1 is a block diagram showing a solid-state drive (SSD) configured with write suppression in accordance with an example embodiment of the present disclosure.

Techniques are disclosed for write suppression to improve the endurance rating of non-volatile memories, such as quad level cell (QLC) NAND or other relatively slow, low endurance memories. In an embodiment, an SSD or other non-volatile memory system is configured with a relatively fast higher endurance frontend non-volatile memory, a relatively slow lower endurance backend non-volatile memory, and a frontend manager that selectively transfers data from the fast memory to the slow memory based on transfer criteria that optimize or otherwise favor write suppression, effectively providing a concatenation of the fast and slow memories. In operation, write data from the host system is initially written to the fast memory by the frontend manager. The frontend manager subsequently transfers the data from the fast memory to the slower backend memory in large chunks or bands, depending on the desired granularity. For each data chunk/band stored in the fast memory, the frontend manager tracks invalid data counts as well as data age. Only chunks/bands that remain valid are transferred to the slow memory. Further note that chunks/bands having a lower rate of invalidity are selected for transfer from the fast memory to the slow memory, rather than chunks/bands having a higher rate of invalidity. After a given chunk/band has been fully transferred, it is erased and thus re-usable for other incoming writes by the frontend manager. In one example embodiment, the fast frontend management framework allows the non-volatile memory system to accomplish 3× or higher write suppression on typical workloads. In addition, the frontend manager can be configured to retain specific blocks in the fast non-volatile memory without needing to duplicate that same content in the slow non-volatile memory. The fast-slow concatenation scheme provides a number of advantages.

General Overview

A NAND cell stores charge (electrons) in a non-volatile manner, such that no power is needed to persist the stored charge. Example NAND memory technologies can be implemented with a number of different architectures such as, for instance, floating gate MOSFET flash and charge trap flash. In any such cases, there are effectively three types of operations that can operate on a NAND cell: read, erase, and write. During a read operation, stored charge of the cell is sensed by readout circuitry without changing the stored charge. During an erase operation, charge is removed from the cell. During a write or 'programming' operation, charge is added to the cell. As is known, a NAND cell must be erased before it can be programmed. Erasing is carried out in blocks, each block including multiple word lines, each word line including one or more pages, and each page including multiple cells. Note that each word line may be partitioned into multiple pages. In any case, programming generally involves repetitively applying a pulse of high voltage to the target cell until the proper voltage value has been programmed into that cell. That programmed voltage level decodes into one or more bits, depending on the bit level of the cell. A single-level cell (SLC) stores a single bit of data and has two program voltage values. Thus, for instance, the first program voltage translates to the single bit being a logic 0 and the second program voltage translates to the single bit being a logic 1. In a similar fashion: a multi-level cell (MLC) stores two bits of data and has four program voltage values; a three-level cell (TLC) stores three bits of value with eight program voltage values; and a quad-level cell (QLC) stores four bits of value with sixteen program voltage values. As previously explained, as more levels are encoded into a single cell, the precision with which the threshold voltage (Vt) is adjusted increases (to ensure that each of the distinct voltage levels is detectable), which in turn results in lower endurance and longer read times (to ensure accurate readout of the precisely programmed voltage). To understand why lower endurance results, note that a NAND flash stores a voltage level that is programmed by controlling the amount of trapped electrons in the gate region. The electrons of the programming voltage are trapped in the cell, in part, by the gate oxide layer. This relatively thin gate oxide layer degrades over time as a result of the erase and write cycles. Specifically, electrons ultimately begin to tunnel into the gate oxide thereby causing a negative charge to form therein, which in turn negates programming voltage applied to the gate during cell programming. As a result of this negation, higher voltages need to be applied for longer durations in effort to reach the target voltage level, causing further degradation of the gate oxide. So, any given cell will eventually wear out, once the programming voltage can no longer be brought into an acceptable tolerance of the target voltage level. However, note that an SLC has the greatest tolerance around its voltage levels (because there are only two levels within the given voltage range), while TLC has much less tolerance around its voltage levels (because there are eight levels within that same voltage range). Thus, higher level cells are more susceptible to the deleterious effects of gate oxide degradation than lower level cells, and will therefore stop being reliable well before lower level cells stop being reliable. Given a QLC cell having a programming voltage range that is the same voltage range as other cells (SLC, MLC, and TLC), but divided up into sixteen discrete voltage levels to provide 4-bits per cell, one can see the significant challenges associated with programming QLC cells, particularly when it comes to meeting reasonable durability expectations. For example, each additional level per cell approximately decreases the endurance by 10× and increases the read time ($T_{read}$) by 2×, but at the same time provides a better cost per bit. To this end, write suppression techniques are needed, particularly those that support QLC-NAND based non-volatile memories.

Thus, and in accordance with various embodiments of the present disclosure, write suppression techniques are disclosed. The techniques are particularly useful for QLC-NAND based non-volatile memories, but can be useful in any storage system that may benefit from write suppression as variously described herein. In an embodiment, an SSD or other non-volatile memory system is configured with a relatively fast higher endurance frontend non-volatile memory, and a relatively slow lower endurance backend non-volatile memory. The data is then selectively waterfalled by a fast frontend manager from the fast memory to the slow memory based on transfer criteria that optimize or otherwise favor write suppression, effectively providing a concatenation of the fast and slow memories. In one example configuration, the fast frontend management framework allows the SSD (or other non-volatile memory system) to accomplish 3× or higher write suppression on typical client workloads. In addition, the frontend manager can be programmed or otherwise configured to pin/retain specific logical block address (LBA) ranges in the fast non-volatile memory without needing to duplicate that same content in the slow non-volatile memory. This fast-slow concatenation provides a cost advantage, particularly when the fast frontend is large (e.g., 8 Gigabytes (GB) or greater). Note that terms such as slow memory, slow backend memory, slow non-volatile memory are used interchangeably herein, as are terms such as fast memory, fast frontend memory, and fast non-volatile memory In operation, write data from the host system is initially written to the fast memory by the frontend manager, and each write can be acknowledged by the frontend manager as complete once the write to the fast memory is complete. The data may be subsequently moved from the fast non-volatile memory to the relatively slower non-volatile memory in large chunks referred to herein as fast bands, which may include, for example, one or more blocks of memory specified by a logical block address (LBA), depending on the desired granularity. In a more general sense, fast bands may be used to refer to any segment of the fast non-volatile memory. In one example embodiment, the fast non-volatile memory is an SLC-NAND based memory array, and the slow non-volatile memory is a QLC-NAND based memory array. Other embodiments may include other fast and slow memory types, depending on the desired relative access speeds and endurances. In any case, the frontend manager is programmed into the SSD controller (e.g., embedded in the SSD firmware) or otherwise provisioned to direct all incoming host writes to the fast memory. For each fast band of data stored in the fast memory, the frontend manager tracks the number of LBAs that are invalid as well as the age of the data. Age of the data can be measured, for example, with respect to how many Megabytes ago that data was written to the fast memory (e.g., since this data was written to the fast memory, another x Megabytes (MB) of data has been written to other locations of the fast memory), although any suitable age indicator can be used as will be appreciated in light of this disclosure. An LBA may become invalid, for instance, because the block specified by the LBA has been written to another location or otherwise replaced, and thus there is now a fresher version of the block specified by the LBA. Only data stored at LBAs that still remain valid are evicted to the slow memory. After a given fast band has been fully evicted, it is erased and therefore re-usable for other incoming writes by the frontend manager.

Tracking the age component in addition to validity (or invalidity, as the case may be) effectively allows for a rate of validity/invalidity to be determined, rather than just static validity/invalidity. For example, if relatively young data is 10% invalid, and older data is 15% invalid, the older data may actually be selected for transfer from the fast memory to the slow memory (depending on how much older it is), rather than the young data. In this sense, the frontend manager recognizes that younger data is more likely to change at a higher rate than older data (e.g., the 10% invalidity can quickly change to 25% invalidity), in accordance with an embodiment. So, in such embodiments, fast bands having a lower rate of invalidity are selected for transfer from the fast memory to the slow memory, rather than fast bands having a higher rate of invalidity.

The endurance of an SSD is measured based on its ability to accept a JEDEC client workload in Terabytes and marketed as 'x' GB/day/5years (according to standard JESD219A, an industry benchmark promulgated by the Joint Electron Device Engineering Council, known as JEDEC, and titled, "Solid-State Drive (SSD) Endurance Workloads"). Client workloads tend to have overwritten data, or so-called trimmed data. The SSD is typically coupled to the host system via a SSD host interface. The host interface may be universal serial bus (USB) interfaces, SAS (e.g., serial attached small computer system interface (SCSI)) interfaces, serial AT attachment (SATA) interfaces, peripheral component interconnect express (PCIe) interfaces, non-volatile memory express (NVMe) interfaces, or the like. As is known, a TRIM command received by an SSD from the operating system (typically via the SSD host interface, such as a SATA interface) informs the SSD which blocks (e.g., LBAs) of the non-volatile memory contain invalid data. Thus, the SSD can reclaim for future use non-volatile memory space occupied by invalid blocks by erasing the memory cells making up those blocks. For a 12GB size of NAND fast frontend memory configured in accordance with an embodiment of the present disclosure, the write suppression process carried out by the frontend manager delivers a reduction (e.g., >3×) in endurance requirement for the slow backend memory. In particular, the write suppression process selects the fast band most qualified for eviction to the slow memory such that invalidation of LBAs is maximized in the fast memory having higher endurance, rather than in the lower endurance slow memory.

Write suppression as used herein is defined to be the ratio of host writes over slow semiconductor memory (e.g., QLC NAND) writes. SSDs are typically subject to writes that have locality. Over several Gigabytes of writes, typical workloads tend to have writes that overwrite/invalidate past writes and hence not all the host writes end up in the lower endurance, slower (higher bits per cell) NAND memory. Thus, an SSD can be configured to accomplish write suppression on workloads using a fast non-volatile memory such as an SLC-NAND memory array (which has 100×+ better endurance and a 4× better read time ($T_{read}$) relative to a slower QLC-NAND memory array) and a management process that exposes part of the fast non-volatile memory to the host, so as to provide a fast-slow concatenated LBA space.

Architecture and Methodology

FIG. 1 is a block diagram showing a solid-state drive (SSD) system 10 configured with write suppression in accordance with an example embodiment of the present disclosure. As can be seen, the SSD system 10 includes an SSD controller 100 operatively coupled with an array of slow non-volatile memory devices (e.g., QLC NAND A-1 ... A-n, B1 ... Bn, ..., m1 ... mn) as well as an array of fast non-volatile memory devices (e.g., SLC NAND or 3D cross-point memory 1, 2, ... n, although other fast non-volatile memory types can be used as well). The controller 100 includes a central processing unit (CPU) 101, a fast frontend (FFE) manager 103, a slow non-volatile memory controller 105, a fast non-volatile memory controller 107, and a host interface 109. Each of these components 101, 103, 105, 107, and 109 can be implemented with conventional technology, except that the FFE manager 103 is programmed or otherwise configured to execute or direct write suppression and the components are arranged and interconnected to facilitate concatenated non-volatile fast and slow memory with write suppression, as variously provided herein. Other suitable arrangements and interconnection schemes capable of achieving such write suppression will be apparent in light of this disclosure.

In one example embodiment, the slow non-volatile memory devices of the M×N array are implemented with QLC NAND flash and controller 105 is a NAND controller, and the fast non-volatile memory devices of the N array are implemented with SLC NAND flash and controller 105 is a NAND controller. Alternatively, the fast non-volatile memory devices of the N array can be implemented with other types of non-volatile memory such as 3-dimensional cross-point memory, ferroelectric memory, silicon-oxide-nitride-oxide-silicon (SONOS) memory, polymer memory such as ferroelectric polymer memory, nanowire, ferroelectric transistor random access memory (FeTRAM or FeRAM), ovonic memory, nanowire, PCMS (phase change memory with switch), phase change memory, memristors and Spin Transfer Torque (STT)—magnetoresistive random access memory (MRAM), and controller 105 can be any suitable fast non-volatile memory controller. In a more general sense, the slow non-volatile memory devices of the M×N array may be implemented with any non-volatile memory having a first durability rating, and the fast non-volatile memory devices of the N array are implemented with any non-volatile memory having a second durability rating that is higher than the first durability rating. Corresponding suitable controllers 105 and 107 can be provided, as will be appreciated.

FFE manager 103 may be implemented in a number of ways. In one example case, FFE manager 103 is implemented as a software module executable by CPU 101. In another example embodiment, FFE manager 103 is implemented as embedded firmware in the controller 100, such as firmware of a dedicated FFE controller within or otherwise in communication with controller 100, or firmware of a general purpose controller provided within the SSD controller 100, or firmware within controller 105 and/or controller 107, or some combination of these controllers, to name a few example scenarios. The FFE manager 103 may further include or otherwise have access to a buffer (e.g., static RAM (SRAM) or some other suitable volatile memory or caching/buffer technology) to temporarily stage write data prior to it being written to the fast non-volatile memory. Such an optional buffer is volatile in some embodiments, but may be non-volatile in others. In some embodiments, such a buffer may be on-chip cache of CPU 101. Host interface 109 may also be programmed or otherwise configured into CPU 101. The size of the M×N slow non-volatile memory array and the fast non-volatile memory can vary from one embodiment to the next.

In operation, a host computing system (e.g., desktop, laptop, mobile phone, tablet, etc) writes data to the storage system through interface 109. The FFE manager 103 causes the data to be written to the fast non-volatile memory array via the fast memory controller 107. As previously explained, there may be a buffering stage for staging data prior to its being written to the fast non-volatile memory. In any case, once data is written in the fast non-volatile memory array or at least successfully buffered, CPU 101 may send an acknowledgement to the host to indicate that the data write request is complete. The FFE manager 103 is further programmed or otherwise configured to manage the fast non-volatile memory and the selective transfer of data from the fast non-volatile memory to the lower endurance slow non-volatile memory. In an embodiment, this transfer is carried out according to a merit equation (as will be explained in turn), so as to provide write suppression that allows the system 10 to meet a higher endurance rating that it wouldn't otherwise meet.

With respect to write suppression, SSD workloads typically are self-invalidating (overwrites same LBA or TRIMs the same LBA) over few 10s of Gigabytes of writes, or so. This comes from the host's file system allocating LBAs for temporary files, deleting them and reallocating the same LBAs over and over. According to an embodiment of the present disclosure, the FFE manager 103 uses SSD internal metrics to detect LBAs that are likely to be overwritten and picks other LBAs that are less likely to be overwritten and moves them to the slow non-volatile memory. Since an LBA may be a too fine a granularity, the tracking can be done in much larger chunks referred to herein as fast bands (or simply bands). In one example case, for instance, a fast band is 1 MB but the granularity can be tuned as desired (assume fast band includes an arbitrary number of LBAs or other blocks). So, for each fast band, the FFE manager 103 is configured to track the number of LBAs that are invalid (NumInValid) and the age of the data, wherein the age of the data refers to, for example, how many Megabytes ago that data was written (Age). Another age indicator may be based on a timestamp associated with the storage date/time of the data. In a more general sense, any indicator of age (how long has data been stored) can be used. These values can then be used compute a merit score for each fast band, and the FFE manager 103 uses the resulting merit scores to decide which fast bands to evict from the fast memory to the slow memory.

The pseudo code for the merit equation executed by the FFE manager 103 according to one embodiment is shown here:

```
unsigned long long   ComputeMerit(int NumInValid, unsigned long Age,
unsigned NumValid)
{
    // Note NumValid and NumInValid are derived from and related to
    // each other. The reason they are both passed down in this example
    // embodiment is because the size of the band can change, when it
    contains defect.
    InvalidityAge = (Age * NumInValid);
    return (InvalidityAge / ((unsigned long long)( NumValid + 1)));
}
```

As previously explained, tracking the age component in addition to validity (or invalidity, as the case may be) effectively allows for a rate of validity/invalidity to be determined, rather than just static validity/invalidity. For example, if relatively young data is 90% valid, and older data is only 85% valid, the older data may actually be selected for transfer from the fast non-volatile memory to the slow non-volatile memory (depending on how much older it is), rather than the seemingly more valid young data. In one such embodiment, the FFE manager 103 is programmed or otherwise configured to identify fast bands having the lowest rate of invalidity (or highest rate of validity) for transfer from the fast non-volatile memory to the slow non-volatile memory. In another embodiment, the FFE manager 103 is programmed or otherwise configured to identify fast bands having a rate of invalidity below a certain threshold (or a rate of validity above a certain threshold) for transfer from the fast non-volatile memory to the slow non-volatile memory.

As can be seen, the merit score is computed by multiplying the age of the data by the number of invalid LBAs of a given band, and dividing the result by the number of valid LBAs of the band plus one. The fast band with largest merit is the candidate for eviction into the slow non-volatile memory, and only the LBAs that remain valid are evicted from that fast band. So, assume a fast band size of 1.024 MB and an LBA size of 256 KB, along with the following metrics indicated in Table 1:

TABLE 1

Example Fast Band Metrics and Merit Scores

| | Metric | | |
|---|---|---|---|
| | Fast Band 1 | Fast Band 2 | Fast Band 3 |
| Age | 1 MB (or time-based) | 1 KB (or time-based) | 1 GB (or time-based) |
| Invalid LBAs | 2 | 0 | 3 |
| Valid LBAs | 2 | 4 | 1 |
| Merit Score | 0.67 | 0.00 | 1.50 |

In this example scenario, note that "age" refers to the number of bytes written to the fast memory since the corresponding LBA was written to that memory, although other age-based metrics can be used well, such as time (e.g., based on a timestamp generated at storage time of the LBA). Further note that fast band 3 has the highest merit score, so the one remaining LBA will be transferred to the slow memory. Given the metrics, it is likely that the data of this one LBA is not fleeting and will likely remain valid for a long period of time. Once the FFE manager 103 causes the transfer of the LBA of fast band 3 from the fast memory to the slow memory, the FFE manager 103 further causes the cells representing the four LBAs of fast band 3 to be erased and thus become available for future writes. Further details of FFE manager 103 will be discussed with reference to FIGS. 2a-d.

Note the write suppression as used herein is not to be confused with minimizing write amplification. As is known, write amplification refers to a limitation associated with flash memory SSDs where the actual amount of data written is a multiple of the amount of data intended to be written, and can generally be computed by data written to the flash memory divided by write data received from the host. Note that write amplification can never be lower than one without some form of compression, and is dependent on factors such as garbage collection and wear leveling.

The host interface 109 may be implemented with any suitable protocol, such as SATA (Serial Advanced Technology Attachment, developed and maintained by the T13 Technical Committee of International Committee for Information Technology Standards (INCITS)), PCIe (Peripheral Component Interconnect Express, developed and maintained by PCI Special Interest Group), SAS (Serial Attached Small computer system interface, developed and maintained by the T10 technical committee of the International Committee for Information Technology Standards (INCITS)), NVMe (Non-Volatile Memory Express, developed and maintained by the NVM Express Work Group), or other interface scheme that facilitate the exchange of information between functional components of controller 100 and the host data source. Slow memory controller 105 is responsive to CPU 101 and FFE manager 103 or otherwise configured to implement the write suppression scheme as provided herein in conjunction with other components of controller 100, and may further operate to manage data stored by the slow non-volatile memory array. For example, controller 105 may manage initialization, read operations, write operations, erase operations, error handling wear leveling, block selection and/or garbage collection for the slow non-volatile memory array. As previously explained, the slow memory array can be a QLC flash NAND array and the controller 105 can be a flash NAND controller, but numerous other embodiments having different slow memory arrays and controller types will be readily apparent in light of this disclosure.

The fast memory controller 107 is responsive to CPU 101 and FFE manager 103 or otherwise configured to implement the write suppression scheme as provided herein in conjunction with other components of controller 100, and may further operate to manage data stored in the fast non-volatile memory array. For example, controller 107 may manage initialization, read operations, write operations, erase operations, error handling, wear leveling and/or garbage collection for the fast non-volatile memory array. As previously explained, the fast non-volatile memory array can be a SLC flash NAND array and the controller 105 can be a flash NAND controller, but numerous other embodiments having different fast non-volatile memory arrays and controller types will be readily apparent in light of this disclosure. For example, in some embodiments the fast non-volatile memory is implemented with write-in-place non-volatile memory such as three dimensional (3D) cross-point memory, PCMS (phase change memory with switch), phase change memory, memristors, and spin transfer torque magnetoresistive random access memory (STT-MRAM), which may be helpful when the performance requirement on the fast frontend is high, such as may be the case during active fast garbage collection. For example, 3D cross-point provides the ability to write in 256 B to 1 KB granularity without the necessity to erase a block prior to writing, and also provides significantly improved write bandwidth at these small write granularities with the cost per bit being comparable to SLC NAND. In addition, write-in-place non-volatile memory technology comes with considerably enhanced endurance compared to SLC NAND (1 million cycles+ vs 100K cycles). Write-in-place non-volatile memory is well-suited as a fast frontend when, for instance, host writes overflow the burst region.

In alternative embodiments, and as previously explained, other non-volatile storage technologies may be utilized to implement the fast and slow non-volatile memories, for example, NAND memory, NOR memory, ferroelectric transistor random access memory (FeTRAM), nanowire memory, byte-addressable three-dimensional cross-point memory, resistive memory, magnetoresistive random access memory (MRAM) memory that incorporates memristor technology, spin transfer torque (STT)-MRAM, byte-addressable random access non-volatile memory, to name a few, wherein an appropriate controller can be used in place of controllers 105 and 107. In one specific example embodiment of write-in-place non-volatile memory, the fast non-volatile memory array is implemented with cross-point architecture, which provides a three-dimensional grid with transistor-less memory cells arranged at the intersection of words lines and bit lines, thereby allowing the cells to be individually addressed. As a result, data can be written and read in small sizes (e.g., byte-addressable). Each memory cell of the fast non-volatile memory array includes a selector and stores a single bit of data, according to one such embodiment. Memory cells are accessed and written or read by varying the amount of voltage sent to each selector. This eliminates the need for transistors, increasing capacity and reducing cost. Other features of the fast and slow non-volatile memories and their respective controllers will be apparent in light of this disclosure. For instance, in some example embodiments, the fast and/or slow non-volatile memory arrays or their respective controllers 105 and 107 may be used to buffer write data and/or store frequently used data, and/or to store a firmware image that may be used to for restoration/restart purposes.

Figure 2A:
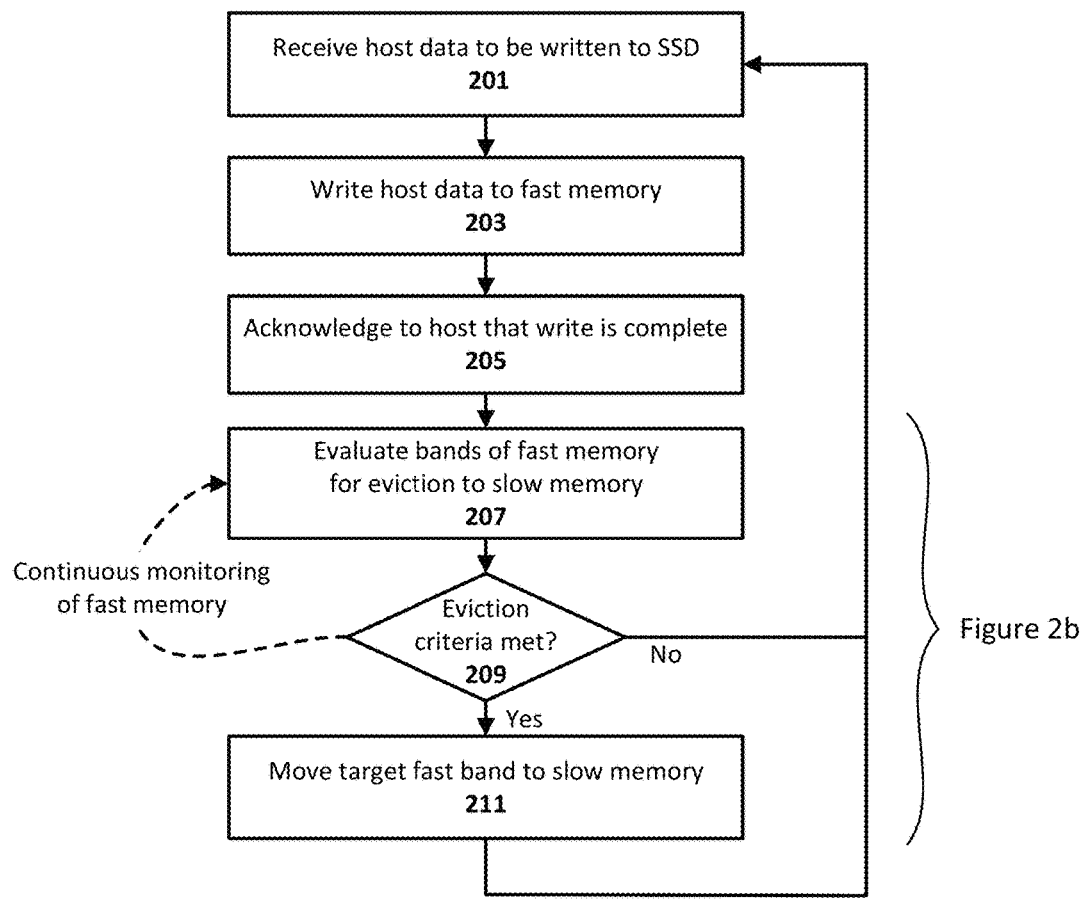
FIGS. 2a-b collectively show a storage methodology configured with write suppression in accordance with an example embodiment of the present disclosure.
Figure 2B:
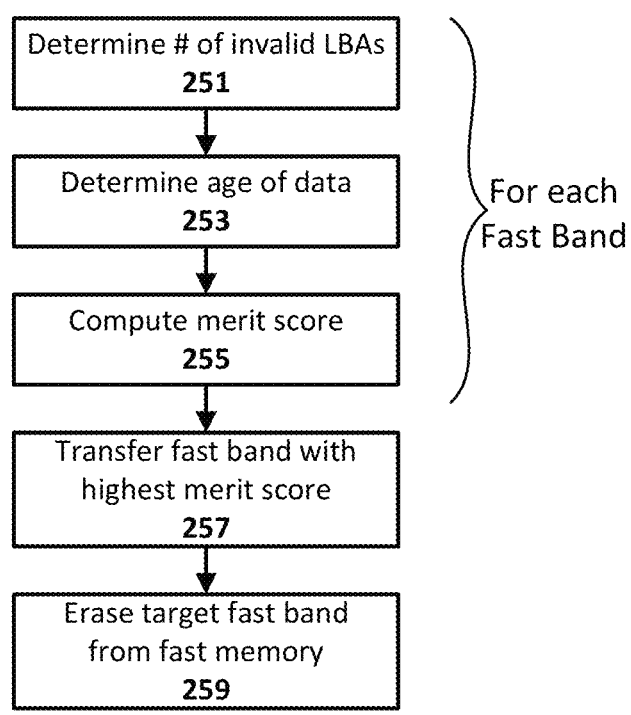

FIGS. 2a and 2b collectively illustrate a storage methodology configured with write suppression in accordance with an example embodiment of the present disclosure. The method may be carried out, for example, by the FFE manager 103 of controller 100, which in turn utilizes and/or directs each of the controllers 105 and 107, as will be appreciated in light of this disclosure. To this end, the method may be implemented in software, hardware (e.g., gate level logic or purpose built semiconductor), firmware, or any combination thereof. In addition to carrying out the programming methodology provided herein, the controller 100 may also carry out conventional functionality.

With reference to FIG. 2a, the method includes receiving, at 201, host data to be written to the SSD. The source data can be received by the host interface 109 and can be any type of data, such as a text document, a photo or image, an video or audio file, or a rich media document, to name a few examples. At 203, the method continues with writing the data to fast non-volatile memory. In the embodiment of FIG. 2a, this is accomplished by the FFE manager directing the write data to memory controller 107, which in turn writes the data to the fast non-volatile memory (e.g., SLC NAND flash or 3D cross-point memory). In some cases, the method may optionally include temporarily buffering the data prior to it being written to the fast non-volatile memory. Such buffering may be accomplished, for example, using a dedicated buffer, or a buffer within CPU 101 or controller 107. In other embodiments, no such intermediate buffering is required. The method may further include at 205 acknowledging to the host that the write to the fast non-volatile memory (or other suitable storage) is complete. Note this acknowledgement can be made prior to the data being transferred to the slow non-volatile memory. This acknowledgement may be provided back to the host by the CPU 101 by way of the host interface 109, for example.

The method continues at 207 with evaluating bands of the fast non-volatile memory for eviction to the slow non-volatile memory. As previously explained, this can be accomplished using a merit computation that assigns a rating or score to each band in the fast non-volatile memory. As previously explained, a fast band may include one or more LBAs or other blocks of memory, depending on the desired granularity. Once the fast band evaluation is done and each band is scored, the method continues with a determination at 209, with respect to whether the eviction criteria have been met. In some embodiments, the fast band having the highest score is designated for transfer to the slow non-volatile memory. In other embodiments, any one or more fast bands having a score above a given eviction threshold is designated for transfer to the slow non-volatile memory. If the eviction criteria are not met at 209, the method repeats at 201 and may continue to receive data to be written to the SSD. As can be further seen by the dashed line in FIG. 2a, note that the method may further include continuously monitoring the fast bands of the fast memory independent of data being written. Such monitoring may be carried out, for instance, on a periodic basis based on a predefined time schedule, such as every 60 minutes, or daily, or weekly, or monthly, to give a few examples). If, on the other hand, the eviction criteria are met at 209, the method continues at 211 with moving the target fast band data to the slow non-volatile memory array (e.g., QLC NAND flash, or other suitable non-volatile memory having lower durability than the fast non-volatile memory). As previously explained, only valid LBAs of the target fast band(s) are transferred. As will be further appreciated, while LBAs are referred to herein, any suitable data blocks making up the fast bands and designatable as valid/invalid can be used), and the present disclosure is not intended to be limited to LBA-based embodiments.

Further example details of the evaluation at 207 and determination at 209 and movement at 211 according to an example embodiment will now be described with reference to FIG. 2b. As can be seen, the FFE manager 103 evaluates the fast bands of the fast non-volatile memory by determining at 251 the number of valid LBAs for each fast band, determining at 253 the age of the data of each fast band, and computing at 255 a merit score for each fast band based on the valid LBA count and data age. As previously explained, one example for this merit score computation is provided by Equation 1:

$$\text{Merit Score} = \text{InvalidityAge}/(\text{NumValid}+1) \qquad \text{(Equation 1)}$$

wherein "InvalidityAge" equals data age times the number of invalid data blocks for a given fast band, and "NumValid" is the number of valid data blocks for the given fast band. Further recall that age can be measured, for example, based on how many bytes ago was it written (i.e., how much data has been stored since that data block was written), or other age indicator that can be used for comparing storage time of one data block to another. Any number of other age-based metrics can be used as well, such as minutes or hours or days since data block was written, so long as the metric used is determined in a consistent manner. Other suitable scoring systems can be used as well as will be appreciated in light of this disclosure. In any case, once the fast bands are scored, the method continues at 257 with transferring the fast band with highest merit score, or the one or more fast bands having a merit score over a given eviction threshold, to the slow non-volatile memory as previously explained. Only the valid LBAs or other data blocks are transferred. The method of this example embodiment concludes at 259 with erasing the target fast band from the fast non-volatile memory post-transfer of the valid data blocks to the slow non-volatile memory.

Write Suppression Simulation and Contrast to Caching

Figure 2C:
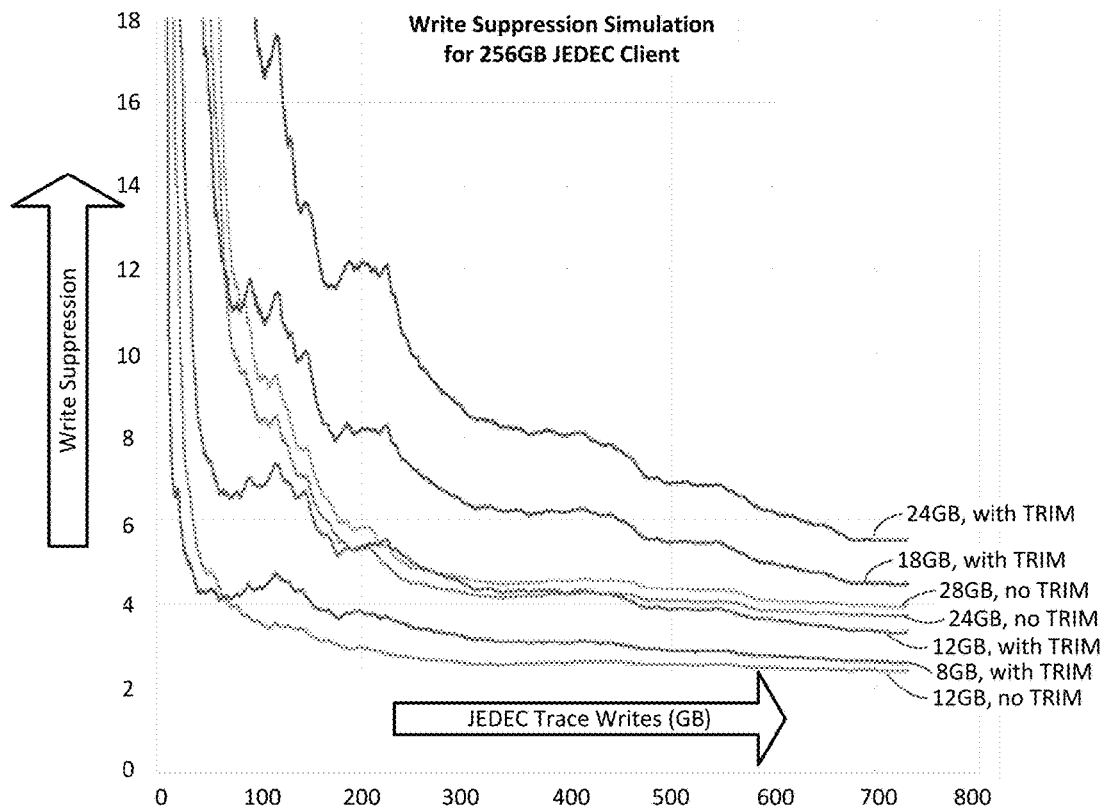
FIG. 2c shows write suppression simulation results, according to an embodiment of the present disclosure.

FIG. 2c shows write suppression simulation results, according to an embodiment of the present disclosure. Simulations were run with the above merit equation (Equation 1) and various sizes for the fast non-volatile memory. From the results, it can be concluded that a write suppression of 3.3× can be achieved with a 12 GB fast non-volatile memory without relying on TRIM and a similar write suppression can be achieved with 8 GB fast non-volatile memory with TRIMs enabled.

Note that the write suppression techniques provided herein should not be confused with simple write caching. A typical cache is optimized for caching read intensive content and for writes, least recently used (LRU) written content is purged from the cache (i.e., oldest data is purged). When LRU-based approach is applied to transfer data from the fast non-volatile memory to the slow non-volatile memory, it produces a mere 1.6× write suppression compared to 4.5× (or better) that write suppression as disclosed herein can provide, according to an embodiment (see simulation of FIG. 2d). Pseudo code for a simple caching approach is shown here:

---
unsigned long long    ComputeMerit(int NumInValid, unsigned long Age, unsigned NumValid)
{
    return (Age); // oldest written data will be picked for eviction
}
---

As can be seen, the merit score for simple caching is determined by the age of the data. The data with largest merit (in this particular case, the oldest data) is the candidate for eviction into the slow non-volatile memory.

Figure 2D:
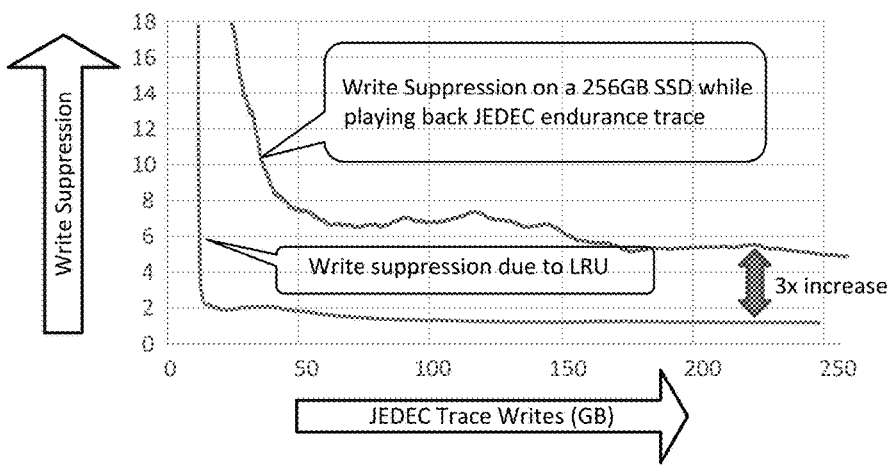
FIG. 2d contrasts write suppression according to an embodiment of the present disclosure with least recently used (LRU) based caching.

FIG. 2d contrasts write suppression according to an embodiment of the present disclosure with LRU-based caching. The simulation of FIG. 2c was done for 3 full drive writes to show that even with garbage collection in slow non-volatile memory, the write suppression provided sufficient useful life to the SSD. The simulation of FIG. 2d simply contrasts the write suppression by the fast frontend only, as typical write caches deal with HDD where there is no backend write amplification or endurance problem. As can be seen, the LRU-based approach produces a write suppression of about 1.6 compared to write suppression of about 4.5 to 5.0 according to an embodiment of the present disclosure, to provide a 3× or better performance increase.

From this comparison, note that the fast memory should not be treated as a cache (i.e., keep duplicate copy that can be accessed fast). Avoiding duplication implies that any fast to slow waterfalling (fast garbage collection) happens during active host writes, in accordance with an embodiment. This results in a performance trade-off where the host can see the fast non-volatile memory capacity but during writes, it also can see the slow non-volatile memory performance (or worse because the fast garbage collection consumes some of the performance from the slow non-volatile memory). Hence it is recommended that a burst size capacity that is not visible to the user but reclaimed during idle periods be used to hide the slow non-volatile memory performance from host writes. In one such example embodiment, a 1GB burst size and 12 GB fast non-volatile memory is used to accommodate JEDEC client workload at 20 GB/day/5 years. Given the performance requirement on the fast non-volatile memory is high during active fast garbage collection, PCM based memory, which has superior write/read bandwidth along with low latency per die, can be used as previously explained as it is well-suited as a fast non-volatile memory when host writes overflow the burst region, according to some such example embodiments.

In addition, in some embodiments, the fast non-volatile memory can be increased in capacity to hold read data that is frequently used. This can be accomplished, for example, by having a bit in the indirection system that can be set or otherwise used to keep LBAs pinned in fast non-volatile memory (so as to effectively provide a pinning flag). As is known, an indirection system generally assigns physical memory locations to LBAs and thus allows physical locations of LBAs to be identified and further allows invalid physical locations to be reclaimed. So, using a bit of the indirection system to designate an LBA as pinned to the fast memory can be readily accomplished.

Thus, an example embodiment of the present disclosure provides an SSD configured with write suppression for typical client workloads. In addition, the SSD can be further configured with a framework that can pin/retain specific LBA ranges in the fast non-volatile memory without needing to duplicate the same content in the slow non-volatile memory. As will be appreciated, this concatenation provides significant cost advantage when the fast frontend is large.

Example Computing System

Figure 3:
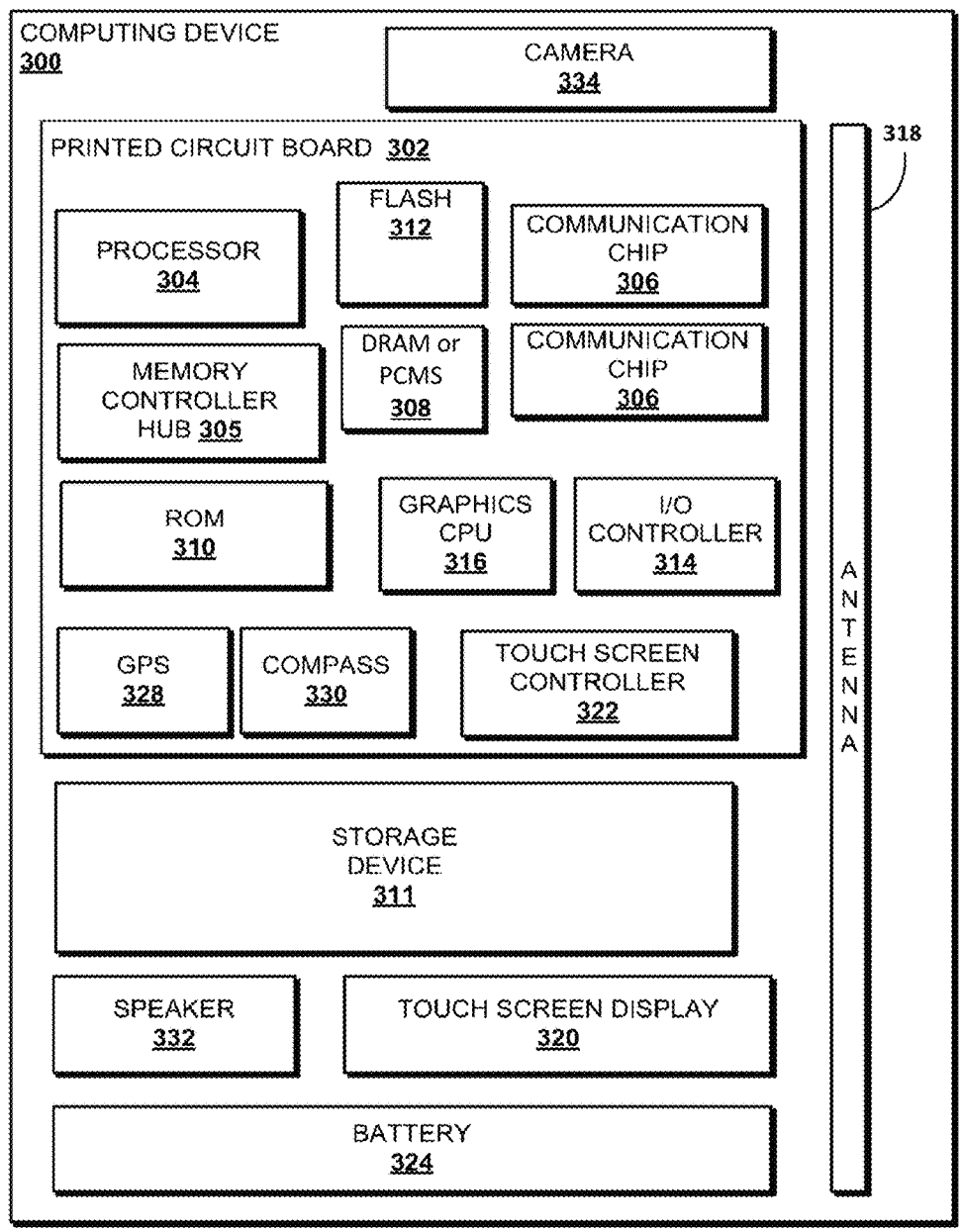
FIG. 3 illustrates a computing device having one or more storage systems configured in accordance with an embodiment of the present disclosure.

FIG. 3 illustrates an example computing device 300 which may employ the apparatuses and/or methods described herein (e.g., storage system of FIG. 1, methodologies of FIGS. 2a-d), in accordance with various embodiments. As shown, computing device 300 may include a number of components, such as one or more processor(s) 304 (one shown) and at least one communication chip 306. In various embodiments, the one or more processor(s) 304 each may include one or more processor cores. In various embodiments, the at least one communication chip 306 may be physically and electrically coupled to the one or more processor(s) 304. In further implementations, the communication chip 306 may be part of the one or more processor(s) 304. In various embodiments, computing device 300 may include printed circuit board (PCB) 302. For these embodiments, the one or more processor(s) 304 and communication chip 306 may be disposed thereon. In alternate embodiments, the various components may be coupled without the employment of PCB 302.

Depending on its applications, computing device 300 may include other components that may or may not be physically and electrically coupled to the PCB 302. These other components include, but are not limited to, memory controller hub 305, volatile memory such as DRAM 308, non-volatile memory such as such as 3D cross-point memory 308 or other suitable write-in-place non-volatile memory (supplement or alternative to DRAM 308), read only memory 310

(ROM), flash memory 312, and storage device 311 (e.g., an SSD or a hard-disk drive (HDD)), an I/O controller 314, a digital signal processor (not shown), a crypto processor (not shown), a graphics processor 316, one or more antenna 318, a display (not shown), a touch screen display 320, a touch screen controller 322, a battery 324, an audio codec (not shown), a video codec (not shown), a global positioning system (GPS) device 328, a compass 330, an accelerometer (not shown), a gyroscope (not shown), a speaker 332, a camera 334, and a mass storage device (such as hard disk drive, a solid-state drive, compact disk (CD), digital versatile disk (DVD))(not shown), and so forth. In various embodiments, the processor 304 may be integrated on the same die with other components to form a System on Chip (SoC).

In some embodiments, the DRAM/3D cross-point memory 308, flash memory 312, and storage device 311 may implement a storage system as described herein, such as the system shown in FIG. 1 or described with respect to FIGS. 2a-d. In some cases, note that the computing device 300 may include the storage device 311 that includes the DRAM/3D cross-point memory 308 and flash memory 312, rather than having those modules separate from device 311. In still other embodiments, the storage device 311 implements an SSD configured as variously described herein to carry out write suppression using a fast-slow concatenation framework as provided herein, and DRAM/3D cross-point memory 308 and flash memory 312 can be additional such memories that supplement similar memories within the device 311.

In some embodiments, the one or more processor(s), flash memory 312, and/or storage device 311 may include associated firmware (not shown) storing programming instructions configured to enable computing device 300, in response to execution of the programming instructions by one or more processor(s) 304, to practice all or selected aspects of the methods described herein (e.g., methods of FIGS. 2a-c). In various embodiments, these aspects may additionally or alternatively be implemented using hardware separate from the one or more processor(s) 304, DRAM/3D cross-point memory 308, flash memory 312, or storage device 311, or hardware integrated therewith.

The communication chips 306 may enable wired and/or wireless communications for the transfer of data to and from the computing device 300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 306 may implement any of a number of wireless standards or protocols, including but not limited to IEEE 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. The computing device 300 may include a plurality of communication chips 306. For instance, a first communication chip 306 may be dedicated to shorter range wireless communications such as Wi-Fi and Bluetooth and a second communication chip 306 may be dedicated to longer range wireless communications such as GPS, EDGE, GPRS, CDMA, WiMAX, LTE, Ev-DO, and others.

In various implementations, the computing device 300 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 300 may be any other electronic device that processes or otherwise stores data.

Further Example Embodiments

The following examples pertain to further embodiments, from which numerous permutations and configurations will be apparent.

Example 1 is a method comprising: receiving data to be written to a non-volatile memory; writing the data to a fast non-volatile memory for storing one or more bands of data; evaluating each of the bands of the fast non-volatile memory to identify a target band for eviction from the fast non-volatile memory to a slow non-volatile memory having a lower durability rating than the fast non-volatile memory; and moving valid data of the target band from the fast non-volatile memory to the slow non-volatile memory, wherein only valid data of the target band are moved from the fast non-volatile memory to the slow non-volatile memory.

Example 2 includes the subject matter of Example 1, and further includes temporarily buffering the data to be written prior to it being written to the fast non-volatile memory.

Example 3 includes the subject matter of Example 1 or 2, and further includes acknowledging to a host that provided the data to be written that the write is complete prior to the data being transferred to the slow non-volatile memory.

Example 4 includes the subject matter of any of the previous Examples, wherein each band of data is associated with a plurality logical block addresses (LBAs), and moving valid data of the target band from the fast non-volatile memory to the slow non-volatile memory comprises moving valid LBAs from the fast non-volatile memory to the slow non-volatile memory, wherein only valid LBAs of the target band are moved from the fast non-volatile memory to the slow non-volatile memory.

Example 5 includes the subject matter of any of the previous Examples, wherein evaluating each of the bands of the fast non-volatile memory to identify a target band for eviction from the fast non-volatile memory to a slow non-volatile memory includes assigning a score to each of the bands in the fast non-volatile memory.

Example 6 includes the subject matter of Example 5, wherein the band having highest score is the target band.

Example 7 includes the subject matter of Example 5, wherein any band having a score above a given eviction threshold is designated as a target band, such that the valid data of each target band is moved from the fast non-volatile memory to the slow non-volatile memory.

Example 8 includes the subject matter of Example 5 through 7, wherein assigning a score to each of the bands in the fast non-volatile memory comprises: determining a number of valid blocks for each band; determining age of the data of each band; and computing the score for each band based on the valid block count and data age.

Example 9 includes the subject matter of Example 8, wherein determining the number of valid blocks for each band comprises determining a number of valid logical block addresses (LBAs) for each band, and determining the age of the data of each band comprises determining how may bytes ago the LBA data was written.

Example 10 includes the subject matter of any of the previous Examples, wherein after moving the valid data of the target band from the fast non-volatile memory to the slow non-volatile memory, the method further comprises erasing the target band from the fast non-volatile memory.

Example 11 includes the subject matter of any of the previous Examples, wherein evaluating each of the bands of the fast non-volatile memory to identify a target band for eviction from the fast non-volatile memory to a slow non-volatile memory comprises continuously monitoring the bands of the fast non-volatile memory independent of data being written.

Example 12 includes the subject matter of any of the previous Examples, wherein in response to no target bands being identified for eviction from the fast non-volatile memory to a slow non-volatile memory, the method includes awaiting receipt of additional data to be written.

Example 13 includes the subject matter of any of the previous Examples, and further includes retaining specific logical block address (LBA) ranges in the fast non-volatile memory so as to eliminate need to duplicate the same content in the slow non-volatile memory.

Example 14 includes the subject matter of any of the previous Examples, wherein the fast non-volatile memory comprises single-level NAND flash memory and the slow non-volatile memory comprises quad-level NAND flash memory.

Example 15 includes the subject matter of any of Examples 1 through 13, wherein the fast non-volatile memory comprises 3D cross-point memory and the slow non-volatile memory comprises multi-level flash memory.

Example 16 includes a non-transitory computer program product comprising instructions encoded thereon that when executed by one or more processors cause a process to be carried out, the process comprising: receiving host data to be written to a non-volatile memory; writing the host data to a fast non-volatile memory for storing one or more bands of data; evaluating each of the bands of the fast non-volatile memory to identify a target band for eviction from the fast non-volatile memory to a slow non-volatile memory having a lower durability rating than the fast non-volatile memory; and moving valid data of the target band from the fast non-volatile memory to the slow non-volatile memory, wherein only valid data of the target band are moved from the fast to slow non-volatile memory.

Example 17 includes the subject matter of Example 16, wherein the process further includes temporarily buffering the host data prior to it being written to the fast non-volatile memory.

Example 18 includes the subject matter of Example 16 or 17, wherein, the process further includes acknowledging to the host that the write is complete prior to the host data being transferred to the slow non-volatile memory.

Example 19 includes the subject matter of any of Examples 16 through 18, wherein each band of data is associated with a plurality logical block addresses (LBAs), and moving valid data of the target band from the fast non-volatile memory to the slow non-volatile memory comprises moving valid LBAs from the fast non-volatile memory to the slow non-volatile memory, wherein only valid LBAs of the target band are moved from the fast to slow non-volatile memory.

Example 20 includes the subject matter of any of Examples 16 through 19, wherein evaluating each of the bands of the fast non-volatile memory to identify a target band for eviction from the fast non-volatile memory to a slow non-volatile memory includes assigning a score to each of the bands in the fast non-volatile memory.

Example 21 includes the subject matter of Example 20, wherein the band having highest score is the target band.

Example 22 includes the subject matter of Example 20, wherein any band having a score above a given eviction threshold is designated as a target band, such that the valid data of each target band is moved from the fast non-volatile memory to the slow non-volatile memory.

Example 23 includes the subject matter of Examples 20 through 22, wherein assigning a score to each of the bands in the fast non-volatile memory includes determining a number of valid blocks for each band; determining age of the data of each band; and computing the score for each band based on the valid block count and data age.

Example 24 includes the subject matter of Example 23, wherein determining the number of valid blocks for each band comprises determining a number of valid logical block addresses (LBAs) for each band, and determining the age of the data of each band comprises determining how may bytes ago the LBA data was written.

Example 25 includes the subject matter of Examples 16 through 24, wherein after moving the valid data of the target band from the fast non-volatile memory to the slow non-volatile memory, the process further comprises erasing the target band from the fast non-volatile memory.

Example 26 includes the subject matter of Examples 16 through 25, wherein evaluating each of the bands of the fast non-volatile memory to identify a target band for eviction from the fast non-volatile memory to a slow non-volatile memory comprises continuously monitoring the bands of the fast non-volatile memory independent of data being written.

Example 27 includes the subject matter of Examples 16 through 26, wherein in response to no target bands being identified for eviction from the fast non-volatile memory to a slow non-volatile memory, the process further includes awaiting receipt of additional data to be written.

Example 28 includes the subject matter of Examples 16 through 27, the process further including retaining specific logical block address (LBA) ranges in the fast non-volatile memory so as to eliminate need to duplicate the same content in the slow non-volatile memory.

Example 29 includes the subject matter of Examples 16 through 28, wherein the fast non-volatile memory comprises single-level NAND flash memory and the slow non-volatile memory comprises quad-level NAND flash memory.

Example 30 includes the subject matter of Examples 16 through 28, wherein the fast non-volatile memory comprises 3D cross-point memory and the slow non-volatile memory comprises multi-level flash memory.

Example 31 includes the subject matter of Examples 16 through 30, wherein the computer program product comprises multiple computer readable mediums.

Example 32 is an apparatus, comprising: a host interface to receive data for storage; and one or more controllers to facilitate write suppression, the one or more controllers configured to: receive host data to be written to the non-volatile memory, the non-volatile memory including a fast non-volatile memory for storing one or more bands of data and a slow non-volatile memory having a lower durability rating than the fast non-volatile memory; write the host data to the fast non-volatile memory; evaluate each of the bands of the fast non-volatile memory to identify a target band for eviction from the fast non-volatile memory to the slow non-volatile memory; and move valid data of the target band from the fast non-volatile memory to the slow non-volatile memory, wherein only valid data of the target band are moved from the fast to slow non-volatile memory.

Example 33 includes the subject matter of Example 32, wherein the one or more controllers further configured to temporarily buffer the host data prior to it being written to the fast non-volatile memory.

Example 34 includes the subject matter of Example 32 or 33, wherein the one or more controllers further configured to acknowledge to the host that the write is complete prior to the host data being transferred to the slow non-volatile memory.

Example 35 includes the subject matter of any of Examples 32 through 34, wherein each band of data is associated with a plurality logical block addresses (LBAs), and the one or more controllers are configured to move valid data of the target band from the fast non-volatile memory to the slow non-volatile memory by moving valid LBAs from the fast non-volatile memory to the slow non-volatile memory, wherein only valid LBAs of the target band are moved from the fast to slow non-volatile memory.

Example 36 includes the subject matter of any of Examples 32 through 35, wherein the one or more controllers are configured to evaluate each of the bands of the fast non-volatile memory to identify a target band for eviction from the fast non-volatile memory to a slow non-volatile memory by assigning a score to each of the bands in the fast non-volatile memory.

Example 37 includes the subject matter of any of Examples 32 through 36, wherein the band having highest score is the target band.

Example 38 includes the subject matter of Examples 32 through 36, wherein any band having a score above a given eviction threshold is designated as a target band, such that the valid data of each target band is moved from the fast non-volatile memory to the slow non-volatile memory.

Example 39 includes the subject matter of any of Examples 32 through 38, wherein the one or more controllers are configured to assign a score to each of the bands in the fast non-volatile memory by: determining a number of valid blocks for each band; determining age of the data of each band; and computing the score for each band based on the valid block count and data age.

Example 40 includes the subject matter of Example 39, wherein determining the number of valid blocks for each band comprises determining a number of valid logical block addresses (LBAs) for each band, and determining the age of the data of each band comprises determining how may bytes ago the LBA data was written.

Example 41 includes the subject matter of any of Examples 32 through 40, wherein after the valid data of the target band are moved from the fast non-volatile memory to the slow non-volatile memory, the one or more controllers are further configured to erase the target band from the fast non-volatile memory.

Example 42 includes the subject matter of any of Examples 32 through 41, wherein the one or more controllers are further configured to continuously monitor the bands of the fast non-volatile memory independent of data being written.

Example 43 includes the subject matter of any of Examples 32 through 42, wherein in response to no target bands being identified for eviction from the fast non-volatile memory to a slow non-volatile memory, the one or more controllers are further configured to await receipt of additional data to be written.

Example 44 includes the subject matter of any of Examples 32 through 43, the one or more controllers further configured to retain specific logical block address (LBA) ranges in the fast non-volatile memory so as to eliminate need to duplicate the same content in the slow non-volatile memory.

Example 45 includes the subject matter of any of Examples 32 through 44, wherein the fast non-volatile memory comprises single-level NAND flash memory and the slow non-volatile memory comprises quad-level NAND flash memory.

Example 46 includes the subject matter of any of Examples 32 through 44, wherein the fast non-volatile memory comprises 3D cross-point memory and the slow non-volatile memory comprises multi-level flash memory.

Example 47 is a computing system including the subject matter of any of Examples 32 through 46. For instance, the apparatus might be included in a desktop or mobile computer system.

Example 48 includes the subject matter of Example 47, wherein the computing system is a mobile computing system. For instance, the apparatus might be included in a smartphone or a tablet or a laptop or a game console or some other mobile computing platform.

The foregoing description of example embodiments of the present disclosure has been presented for the purposes of illustration and description. It is not intended to be exhaustive or to limit the present disclosure to the precise forms disclosed. In addition, note that terms such as solid-state drive, SSD, solid-state storage device, solid-state storage system are used interchangeably herein. Any such storage facilities can be used in any number of storage applications, including desktop computers, mobile computers, and mobile computing devices. Many modifications and variations are possible in light of this disclosure. It is intended that the scope of the present disclosure be limited not by this detailed description, but rather by the claims appended hereto.

What is claimed is:
1. A method comprising:
receiving data to be written to a non-volatile memory;
writing the data to a fast non-volatile memory for storing one or more bands of data;
evaluating each of the bands of the fast non-volatile memory to identify one or more target bands for eviction from the fast non-volatile memory to a slow non-volatile memory having a lower durability rating than the fast non-volatile memory, wherein evaluating each of the bands of the fast non-volatile memory comprises:
determining a number of valid data blocks for each of the bands of the fast non-volatile memory;
determining an age of data of each of the bands of the fast non-volatile memory;
computing a merit score for each of the bands of the fast non-volatile memory based on a ratio of a number of invalid data blocks to the number of valid data blocks for each of the bands and further based on the age of the data for each of the bands, wherein any band having the merit score above a given eviction threshold is designated as a target band; and moving valid data of the one or more target bands from the fast non-volatile memory to the slow non-volatile memory, wherein only valid data of the one or more target bands are moved from the fast non-volatile memory to the slow non-volatile memory.

2. The method of claim 1 wherein determining the number of valid blocks for each band comprises determining a number of valid logical block addresses (LBAs) for each band, and determining the age of the data of each band comprises determining how may bytes ago the LBA data was written.

3. The method of claim 1 wherein after moving the valid data of the one or more target bands from the fast non-volatile memory to the slow non-volatile memory, the method further comprises:
erasing the one or more target bands from the fast non-volatile memory.

4. The method of claim 1, further comprising:
retaining specific logical block address (LBA) ranges in the fast non-volatile memory so as to eliminate need to duplicate the same content in the slow non-volatile memory.

5. A non-transitory computer program product comprising instructions encoded thereon that that when executed by one or more processors cause a process to be carried out, the process comprising:
receiving host data to be written to a solid-state storage device;
writing the host data to a fast non-volatile memory for storing one or more bands of data;
evaluating each of the bands of the fast non-volatile memory to identify one or more target bands for eviction from the fast non-volatile memory to a slow non-volatile memory having a lower durability rating than the fast non-volatile memory, wherein evaluating each of the bands of the fast non-volatile memory comprises:
determining a number of valid data blocks for each of the bands of the fast non-volatile memory;
determining an age of data of each of the bands of the fast non-volatile memory;
computing a merit score for each of the bands of the fast non-volatile memory based on a ratio of a number of invalid data blocks to the number of valid data blocks for each of the bands and further based on the age of the data for each of the bands, wherein any band having a score above a given eviction threshold is designated as a target band; and
moving valid data of the one or more target bands from the fast non-volatile memory to the slow non-volatile memory, wherein only valid data of the one or more target bands are moved from the fast to slow non-volatile memory.

6. The computer program product of claim 5, the process further comprising at least one of:
temporarily buffering the host data prior to it being written to the fast non-volatile memory; and
acknowledging to the host that the write is complete prior to the host data being transferred to the slow non-volatile memory.

7. The computer program product of claim 5 wherein each band of data is associated with a plurality logical block addresses (LBAs), and moving valid data of the one or more target bands from the fast non-volatile memory to the slow non-volatile memory comprises moving valid LBAs from the fast non-volatile memory to the slow non-volatile memory, wherein only valid LBAs of the one or more target bands are moved from the fast to slow non-volatile memory.

8. The computer program product of claim 5 wherein determining the number of valid blocks for each band comprises determining a number of valid logical block addresses (LBAs) for each band, and determining the age of the data of each band comprises determining how may bytes ago the LBA data was written.

9. The computer program product of claim 5 wherein after moving the valid data of the one or more target bands from the fast non-volatile memory to the slow non-volatile memory, the process further comprises:
erasing the one or more target bands from the fast non-volatile memory.

10. The computer program product of claim 5 wherein evaluating each of the bands of the fast non-volatile memory to identify the one or more target bands for eviction from the fast non-volatile memory to a slow non-volatile memory comprises continuously monitoring the bands of the fast non-volatile memory independent of data being written.

11. The computer program product of claim 5, further comprising:
retaining specific logical block address (LBA) ranges in the fast non-volatile memory so as to eliminate need to duplicate the same content in the slow non-volatile memory.

12. An apparatus comprising:
a host interface to receive data for storage; and
one or more controllers to facilitate write suppression, the one or more controllers configured to:
receive host data to be written to a non-volatile memory, the non-volatile memory including a fast non-volatile memory for storing one or more bands of data and a slow non-volatile memory having a lower durability rating than the fast non-volatile memory;
write the host data to the fast non-volatile memory;
evaluate each of the bands of the fast non-volatile memory to identify one or more target bands for eviction from the fast non-volatile memory to the slow non-volatile memory, wherein evaluating each of the bands of the fast non-volatile memory comprises:
determine a number of valid data blocks for each of the bands of the fast non-volatile memory;
determine an age of data of each of the bands of the fast non-volatile memory; and
compute a merit score for each of the bands of the fast non-volatile memory based on a ratio of a number of invalid data blocks to the number of valid data blocks for each of the bands and further based on the age of the data for each of the bands, wherein any band having the merit score above a given eviction threshold is designated as a target band; and
move valid data of the one or more target bands for eviction from the fast non-volatile memory to the slow non-volatile memory, wherein only valid data of the one or more target bands are moved from the fast to slow non-volatile memory.

13. The apparatus of claim 12 wherein each band of data is associated with a plurality logical block addresses (LBAs), and the one or more controllers are configured to move valid data blocks of the one or more target bands from the fast non-volatile memory to the slow non-volatile memory by moving valid LBAs from the fast non-volatile memory to the slow non-volatile memory, wherein only valid LBAs of the one or more target bands are moved from the fast to slow non-volatile memory.

14. The apparatus of claim 12,
wherein determining the number of valid blocks for each band comprises determining a number of valid logical block addresses (LBAs) for each band, and determining the age of the data of each band comprises determining how may bytes ago the LBA data was written.

15. The apparatus of claim 12 wherein after the valid data of the one or more target bands are moved from the fast non-volatile memory to the slow non-volatile memory, the one or more controllers are further configured to:
erase the one or more target bands from the fast non-volatile memory.

16. The apparatus of claim 12, the one or more controllers further configured to:
retain specific logical block address (LBA) ranges in the fast non-volatile memory so as to eliminate need to duplicate the same content in the slow non-volatile memory.

17. The apparatus of claim 12 wherein the fast non-volatile memory comprises single-level NAND flash memory and the slow non-volatile memory comprises quad-level NAND flash memory.

18. The apparatus of claim 12 wherein the fast non-volatile memory comprises 3D cross-point memory and the slow non-volatile memory comprises multi-level flash memory.

* * * * *